United States Patent [19]
Ueffinger et al.

[11] Patent Number: 5,660,383
[45] Date of Patent: Aug. 26, 1997

[54] SHEET RECORDING MATERIAL TRANSPORT APPARATUS

[75] Inventors: Friedrich Ueffinger, Schorndorf; Kurt Blank, Ebersbach/Fils; Gerd Hoitz, Unterensingen; Alfred Trumpp; Ernst Neitzel, both of Stuttgart, all of Germany

[73] Assignee: Eastman Kodak Company, Rochester, N.Y.

[21] Appl. No.: 439,326

[22] Filed: May 11, 1995

[51] Int. Cl.$^6$ .................................................. B65H 5/22
[52] U.S. Cl. .................... 271/3.18; 271/199; 271/200; 271/300; 271/302
[58] Field of Search ................. 271/3.14, 3.18, 271/3.2, 3.21, 264, 198, 199, 200, 302, 300; 198/631.1, 463.2, 457, 861.1

[56] References Cited

U.S. PATENT DOCUMENTS 5,326,093   7/1994   Sollitt ........................ 271/302 X

FOREIGN PATENT DOCUMENTS

| | | | |
|---|---|---|---|
| 37 18 131 | 12/1990 | Germany . | |
| 37 05 851 | 8/1991 | Germany . | |
| 4232733 | 3/1994 | Germany ........................ 271/264 |
| 1081566 | 8/1967 | United Kingdom .............. 271/198 |

*Primary Examiner*—David H. Bollinger
*Attorney, Agent, or Firm*—Peyton C. Watkins

[57] ABSTRACT

A film transport apparatus (3) for sheet film is provided on the rear side of a cassette loading/unloading unit and a processing unit (2) positioned next to the latter. Film transport apparatus (3) comprises a transport table which can be moved back and forth on a horizontal plane and which transports a sheet film ejected through output opening (1b) of said loading/unloading unit into an input opening (2b) of processing unit (2). Transport table (8) is guided in vertical direction in such a manner (14) that its end (17, 20) facing input and output openings (1b; 2b), respectively, can be raised and lowered into the transport plane of said input and output openings (1b; 2b). A guideway (14) controlling the vertical movement of said transport table can be adjusted selectively into different positions of inclination and/or height in order to be able to adapt the transport plane of transport table (8) to vertical height differences between output opening (1b) and input opening (2b). An adapter (4) interposed between housing (7) of film transport apparatus (3) and processing unit (2) bridges different unit depths of adjacently arranged units (1 and 2). Furthermore, film transport apparatus (3) can be connected with an input device (52) which permits the insertion of large-format sheet film in particular on the darkroom side.

14 Claims, 10 Drawing Sheets

SHEET RECORDING MATERIAL TRANSPORT APPARATUS

FIELD OF THE INVENTION

The invention herein relates to an apparatus for transporting sheet recording material, in particular sheet film, from a cassette loading/unloading unit to a processing unit comprising, interposed between the output opening of said loading/unloading unit and the input opening of said processing unit, a transport table which comprises driven transport means and bridges differences between the vertical positions of said output and input openings of said loading/unloading unit and said processing unit, respectively, and is selectively adapted so said openings.

BACKGROUND OF THE INVENTION

DE-37 18 131-C2 has disclosed a sheet film transport apparatus comprising a transport table which transports film sheets ejected by a cassette loading/unloading unit to a processing unit, whereby said transport table may be adapted selectively to different input/output opening of attached units. This apparatus, however, is suitable only for the straight, linear transport from the cassette loading/unloading unit to the processing unit requiring that these units be set up in sequence. This arrangement requires a large setup area due to the unit's overall depth and length and, furthermore, the apparatus' input and output sites are located at a distance and facing away from each other on opposite sides.

The invention herein is to solve this problem by providing a transport apparatus of the described type constructed such that units connected with said apparatus may be set up in a space-saving and user-friendly manner next to each other and that, furthermore, a right/left association is achieved.

SUMMARY OF THE INVENTION

In accordance with the present invention this has been accomplished in that the transport table can be moved back and forth along horizontally adjacent output and input openings of the loading/unloading unit and the processing unit; the transport means of said transport table positioned in output and input transport directions can be driven in output transport direction in a first end position of said transport table associated with the output opening and in input transport direction in a second end position associated with the input opening; and said transport table can be moved in vertical direction such that its front end facing said input and output openings can be raised and lowered into the transport plane of said output and input openings.

Advantageously, said transport table is pivotally mounted to a carriage moved in horizontal direction in a manner allowing its front end facing said input or output opening to be raised or lowered into the transport plane of said input or output opening. In so doing, the front end of said transport table is supported by means of a rotatable wheel on a stationary guideway extending from the output opening of the processing unit to the input opening of said loading/unloading unit and being positioned in an inclined position compensating for the differences in height between said input and output openings.

The transport means of said transport table comprise continuous transport belts and transport rollers guided on rotatably supported shafts. In an advantageous embodiment both ends of one of the shafts are provided with a dog which, in the first or second end position of said transport table, can be brought into engagement with a first or second one-way jaw clutch driven by a common drive comprising a reversible motor.

Said transport table comprises a support for the shafts, transport belts and transport rollers provided with lateral limiting walls for the recording material. In an advantageous embodiment said limiting walls comprise resilient elastic activating pins extending into the transport zone of said recording material. Each of said activating pins located on both sides of said support controls a pivoting cover flag associated with a stationary photoelectric barrier such that said transport table is stopped in an operation-appropriate end position in which said recording material may run freely into the input opening of the processing unit.

In a convenient embodiment, said transport table and its guiding and driving means are accommodated in a light-tight housing which may be attached to the cassette loading/unloading and processing units. An adapter bridging different unit depths and comprising transport means in the transport plane of the respective unit is interposed between said housing and one of said units. The guideway for the wheel located on the front end of said transport table can be adjusted optionally inside said housing for various positions of inclination and height in order to adapt the vertical position of the input and output openings of the units. In addition, the overall vertical position of said housing may be adjusted to adapt it to said output and input openings of said units.

Advantageously, the film transport apparatus can be set up to permit the right/left association of units if desired. An adaptation to the input and output openings of the units is possible irrespective of the vertical (higher or lower) position of the input opening of the processing unit relative to the output opening of the cassette loading/unloading unit.

In an another advantageous form of embodiment of the invention herein the transport table housing may be docked to a darkroom-side input device for large-format recording material which cannot be handled by the loading/unloading unit. This input device, which may be attached to the rear side of said housing and extends into the darkroom, constitutes an extension of the transport plane when the transport table is in its end position associated with the processing unit, whereby a particularly straight and non-destructive film transport is achieved by the available transport table. Advantageously, the input device on the darkroom side may also be used for the input of films having other formats, for example, in instances of temporary unavailability of the cassette loading/unloading unit due to maintenance.

The inventive embodiment and arrangement of the transport table is achieved advantageously in that the reliable and non-destructive transport of recording material becomes possible with optional right/left association of the units even when respective input and output openings of the units are in different vertical positions.

Additional features and advantages are disclosed by the description of inventive examples of embodiment shown by the drawings and by subclaims.

DETAILED DESCRIPTION OF THE INVENTION

The inventive film transport apparatus 3 is described in conjunction with a commercially available loading/unloading unit 1 for sheet film cassettes as disclosed by DE-37 05 951-C2. Film transport apparatus 3 connects said loading/unloading unit 1 with a commercially available processing unit 2 positioned directly adjacent the latter as shown by FIG. 1.

Figure 1:
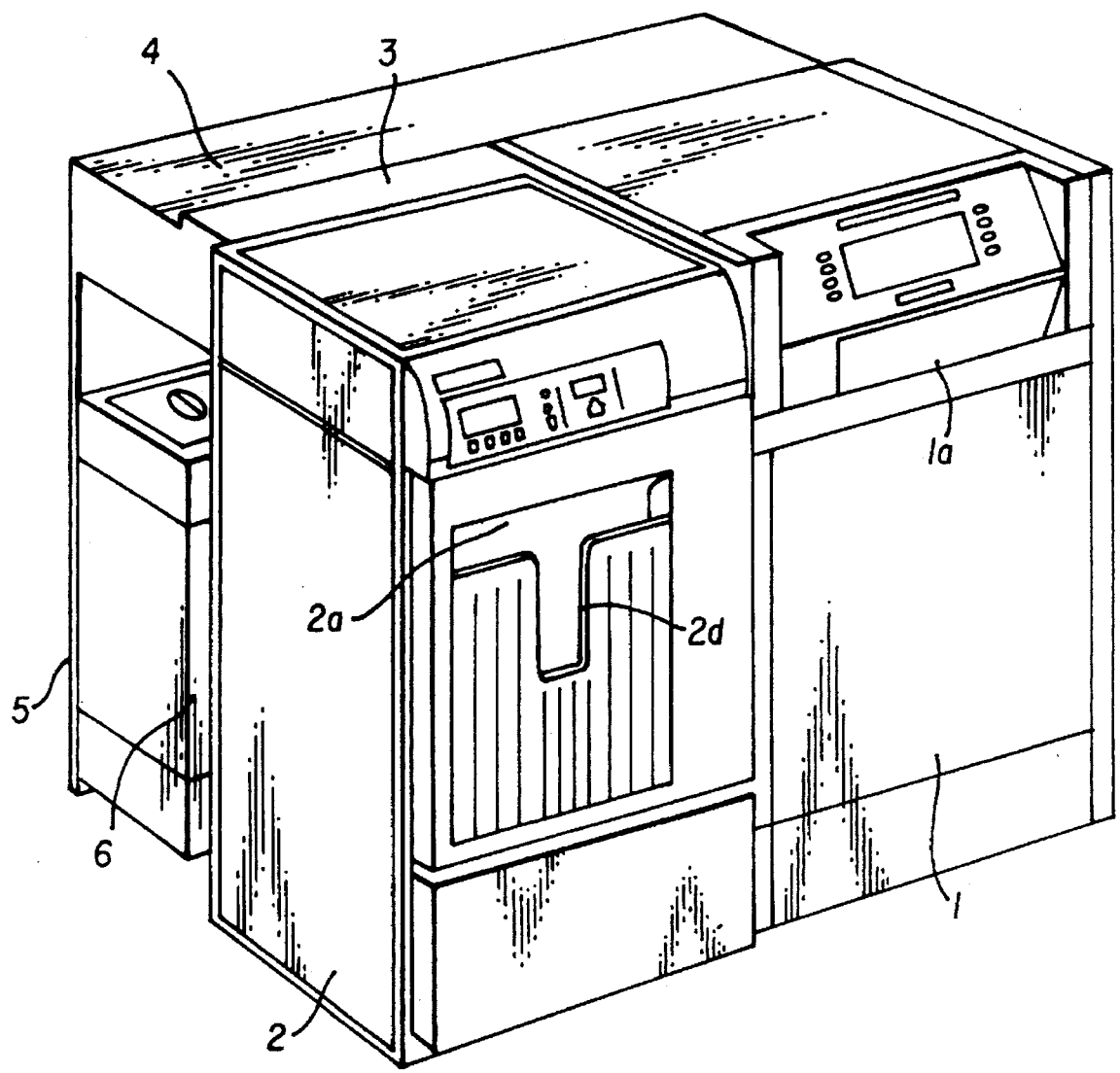
FIG. 1 is an assembly view of the film transport apparatus docked to a cassette loading/unloading unit as well as a processing unit.
Figure 11:
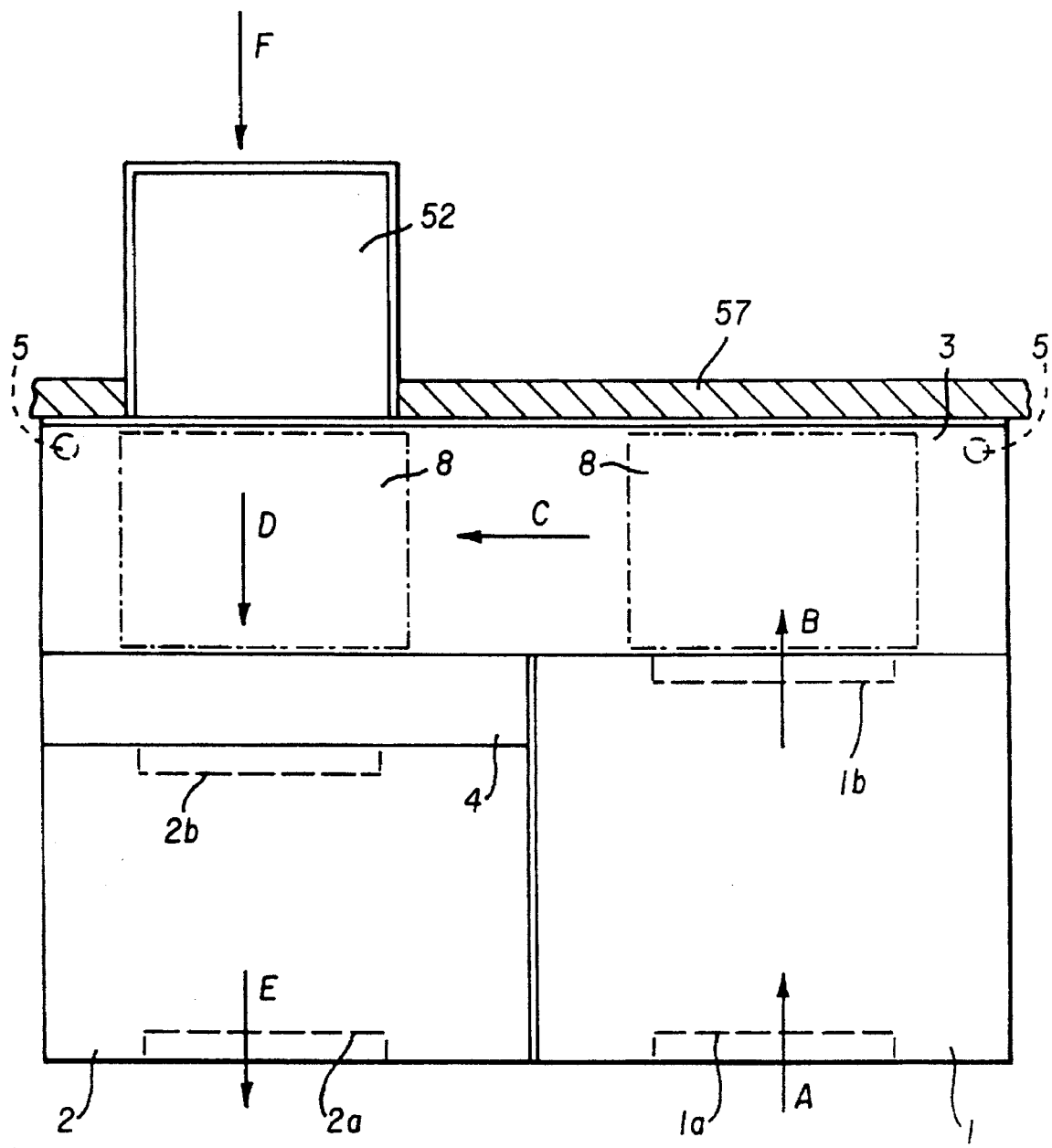
FIG. 11 is a schematic plan view of the unit assembly in accordance with FIGS. 1 and 10, respectively.

Referring to FIGS. 1 and 11, the principle of operation of apparatus units 1, 2 and 3 will be explained first.

A conventional (not illustrated) sheet film cassette containing exposed sheet film is inserted in the direction of arrow "A" in a loading opening 1a on the front side of loading/unloading unit 1. Inside said unit said cassette is opened and the exposed sheet film taken out. The exposed sheet film is transported in the direction of arrow "B" by the unit's transport means 1c (see FIG. 8) to an output opening 1b on the rear side of unit 1 and transported in the direction of arrow "C" inside film transport apparatus 3. Then the exposed sheet film is transported in the direction of arrow "D" through an adapter 4 and an input opening 2b into processing unit 2. Once the exposed sheet film has passed through processing unit 2 in a known not illustrated manner, the processed finished sheet film is ejected through a film output opening 2a into a receiving tray 2d on the front side of processing unit 2.

The construction and operation of film transport apparatus 3 will be described in detail hereinafter.

Film transport apparatus 3 comprises a light-tight box-shaped housing 7 (see in particular, FIGS. 2, 8 and 9) such that its longitudinal side is docked in a light-tight manner to loading/unloading unit 1 and, by means of an adapter 4, to processing unit 2. Adjustable supports 5 resting on the unit setup area support the opposite longitudinal side of housing 7. Housing 7 accommodates a transport table 8 on a carriage 23 which can be moved on a stationary rail 28. As illustrated in a particularly clear manner in FIGS. 2 and 3, guide rail 28 is mounted to an interior wall of housing 7 and bas convex, horizontal as well as parallel, superposed running surfaces 28a and 28b.

Pairs of rollers 24, 25 and 26, 27 having concave running surfaces are guided in positive contact with running surfaces 28a, 28b of guide rail 28, allowing the movement of carriage 23. Carriage 23 is moved by drawing means 31 mounted to a projection 23c of carriage 23. Said drawing means 31 is moved via a drive wheel 30 and guided by an additional, stationary wheel 32. Said drive wheel 30 is mounted to drive shaft 29a of a stationary motor 29.

Above rollers 24, 26 of carriage 23 has two support sites 23b, 23c which are open toward the top and located in a plane parallel to running surfaces 28a and 28b and at a distance from each other (see FIG. 3), considering the longitudinal extension of guide rail 28.

Figure 5:
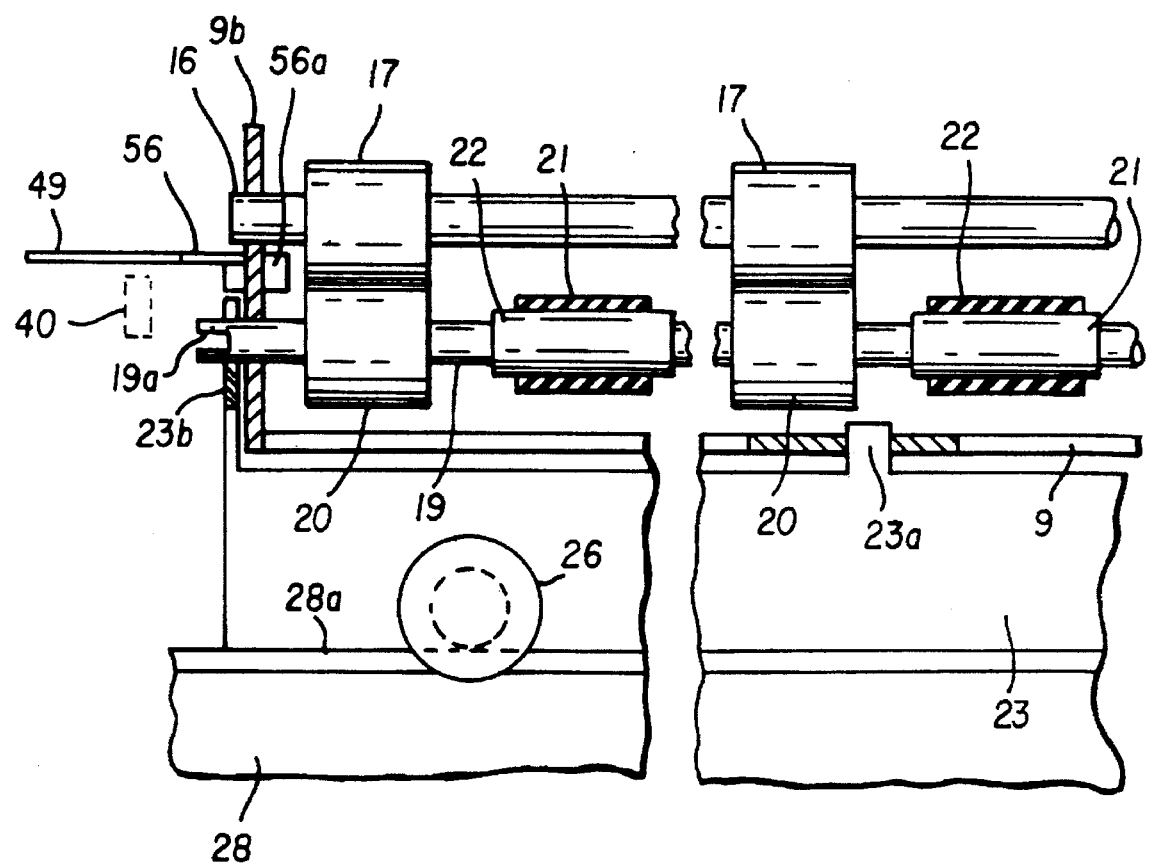
FIG. 5 is a partial sectional rear view in accordance with FIG. 2 along line A—A.

Transport table 8 (see, in particular, FIGS. 2, 5 and 6) comprises a U-shaped support 9 with limiting walls 9a, 9b, bent upward at an angle, which is installed parallel to transport directions "B" and "D" (see FIG. 11). Lower shafts 18, 19 and superposed parallel shafts 15, 16 are rotatably mounted to limiting walls 9a, 9b. Pairs of transport rollers 17, 20 are mounted opposite each other on shafts 15, 16, 18, 19. Shafts 15, 18 are associated with the front end of transport table 8 associated with units (1 and 2, respectively), whereas shafts 16, 19 are associated with the opposite rear end. Guide rollers 21 supporting continuous transport belts 22 are mounted to lower shafts 18, 19 between pairs of transport rollers 17, 20. Upper shafts 15, 16 are spring-biased against lower shafts 18, 19 in a conventional (not illustrated) manner.

Figure 2:
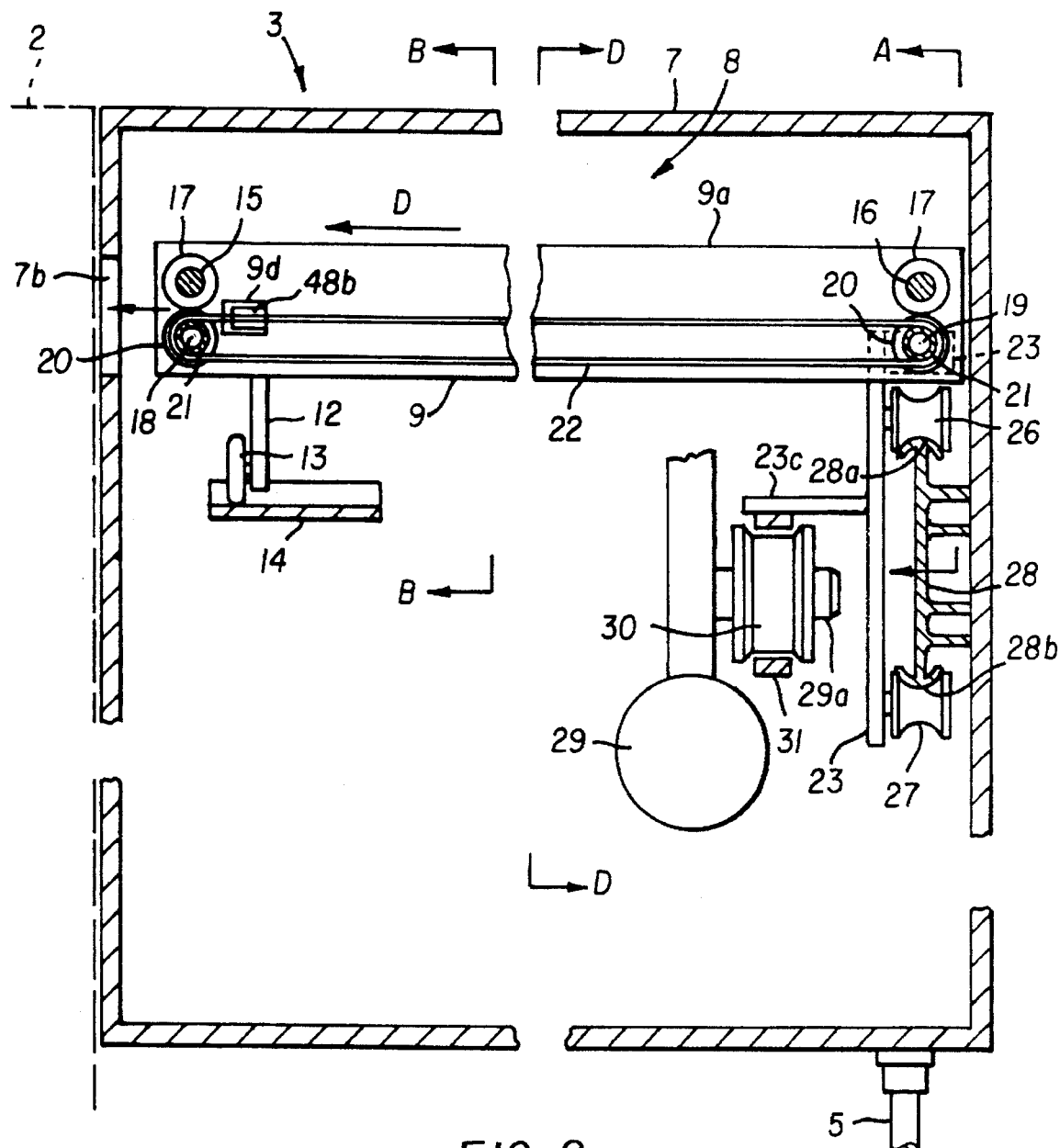
FIG. 2 is a sectional side view of the film transport apparatus of FIG. 1.

FIG. 2 shows that support 9 of transport table 8 can be pivoted on support sites 23b, 23c by means of lower rear shaft 19 and is fixed in axial direction by a carriage projection 23a, (see FIG. 6) which fits into a recess 9c on the bottom of support 9. Inasmuch as support sites 23b, 23c are open toward the top, the entire transport table 8 may be removed easily. By providing support sites 23b, 23c in the same plane as guide rail 28 a favorable weight distribution of carriage 23 is achieved.

Figure 7:
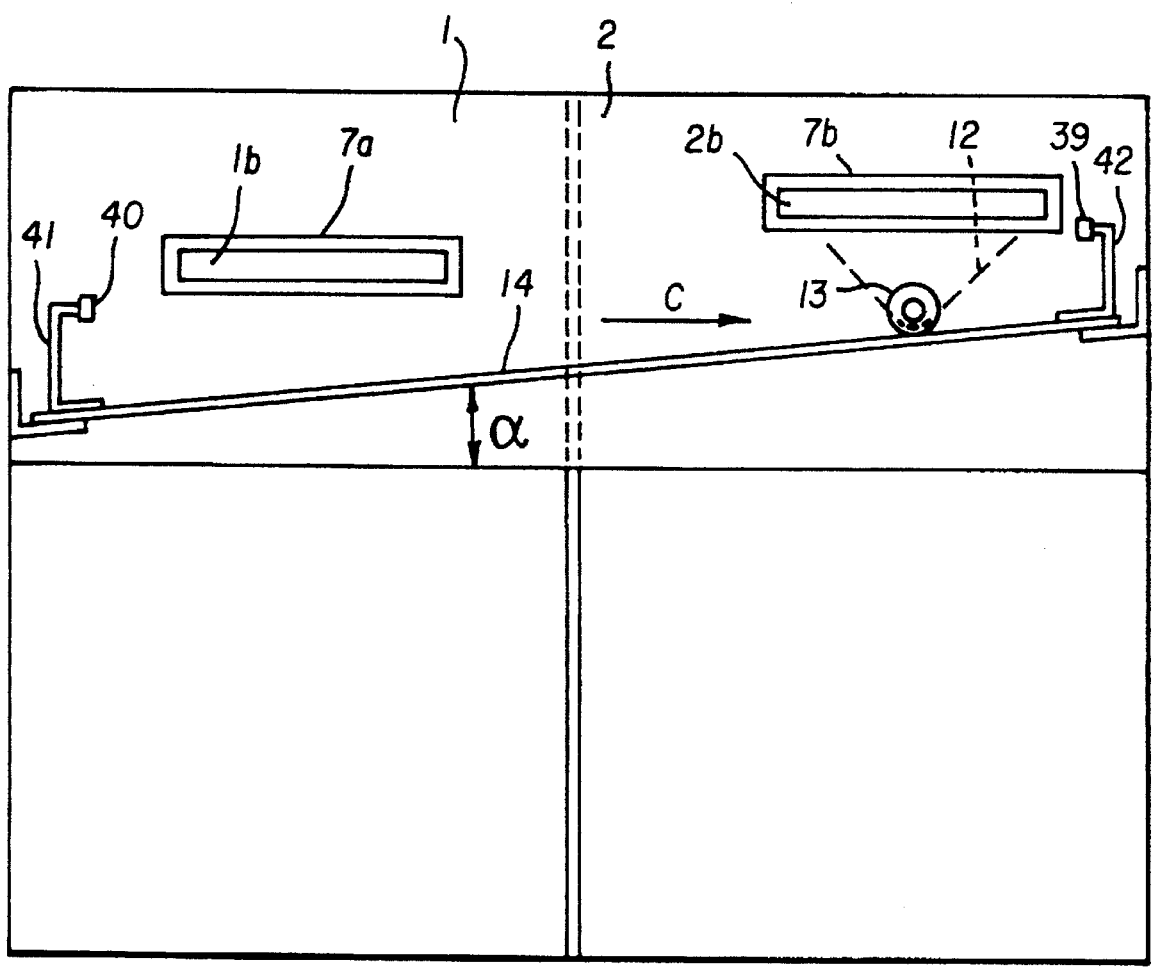
FIG. 7 is the apparatus of FIG. 2 with a schematic illustration of the guideway position in longitudinal section along line B—B, without the transport table.

On the underside of support 9 is an arm 12 associated with the front end of transport table 8, said arm supporting a rotating wheel 13. Said wheel 13 runs on a guideway 14 and supports the front end of transport table 8. Guideway 14 mounted to housing 7 extends in longitudinal direction of guide rail 28. However, FIG. 7 shows guideway 14 inclined at an angle a relative to the horizontal plane. Guideway 14 extends from output opening 1b of loading/unloading unit 1 to input opening 2b of processing unit 2 and its endpoints can be adjusted in vertical direction by conventional not illustrated means. This feature allows the adjustment of guideway 14 in different angular positions as well as in a not illustrated opposite inclined position different from that of FIG. 7.

When guideway 14 is in the inclined position subtending angle a, said transport table can be moved into the transport plane of output opening 1b and input opening 2b located at different vertical distances from the installation surface of units 1 and 2. Inasmuch as said guideway is adjustable, the vertical pivoting motion of transport table 8 can be adapted to the individual height of input opening 2b of processing unit 2 which, depending on the type of unit, may be above or below output opening 1b of loading/unloading unit 1. Furthermore, this feature of being able to adjust guideway 14 allows a convenient optional right/left association of units 1 and 2.

Photoelectric barriers 39, 40, which may be adjusted in a conventional (not illustrated) manner, are mounted on holders 41, 42 in the respective end zones of guideway 14.

The exterior sides of both limiting walls 9a, 9b of support 9 have cover flags 47, 48 and 49, 56 associated with photoelectric barriers 39, 40. Said cover flags 47, 48 and 49, 56 are located at a distance from each other in the direction of movement of carriage 23, whereby cover flags 47, 49 are rigidly mounted, while cover flags 48, 56 can be pivoted in horizontal direction. Pivoting cover flags 48, 56 are mounted to a flexible elastic arm 48a (shown for one side only) with an activating pin 48b, 56a extension. Said activating pin 48b, 56a extends through an opening (9d) of limiting wall 9a, 9b into the transport zone of the sheet film and, in a still to be described manner, controls the position of the film exiting the loading/unloading unit 1 to assure the appropriate orientation with respect to input opening 2b of processing unit 2.

Figure 3:
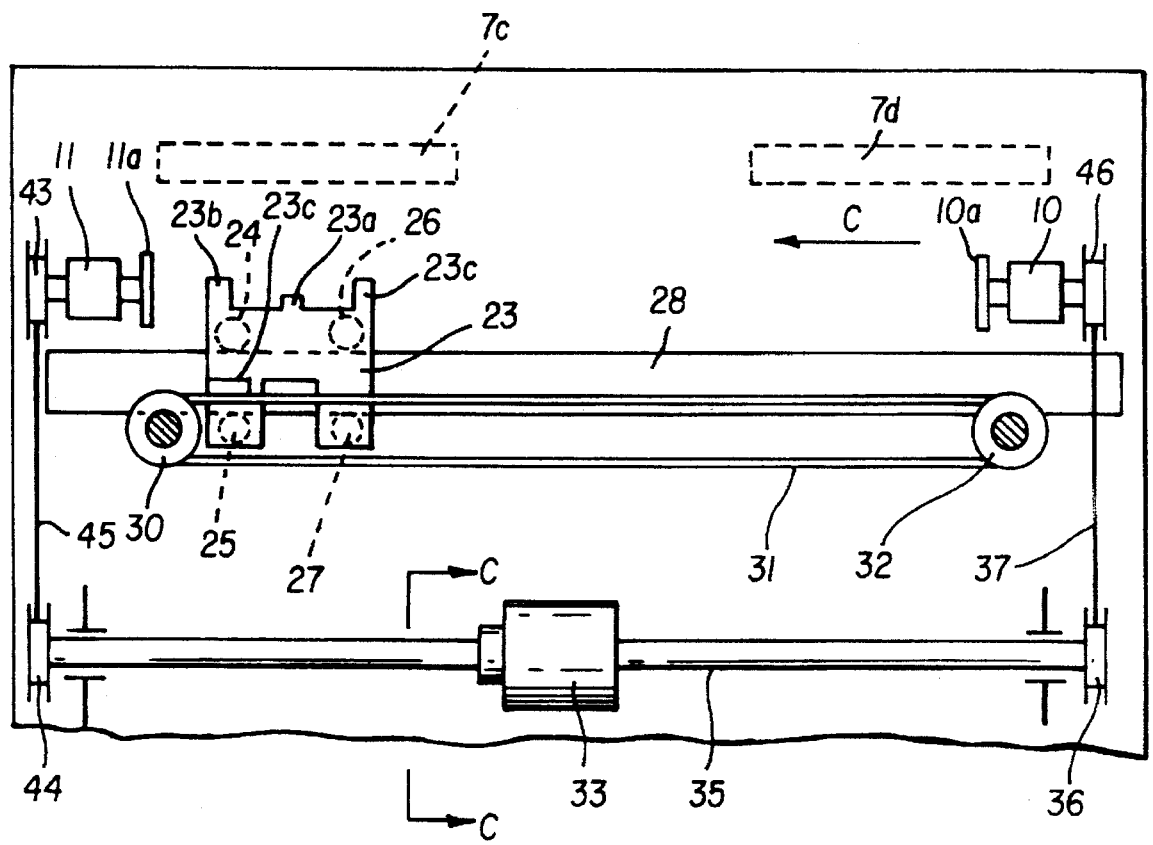
FIG. 3 is a simplified sectional view of the film transport apparatus of FIG. 1 in longitudinal direction along line D—D, without the transport table.
Figure 4:
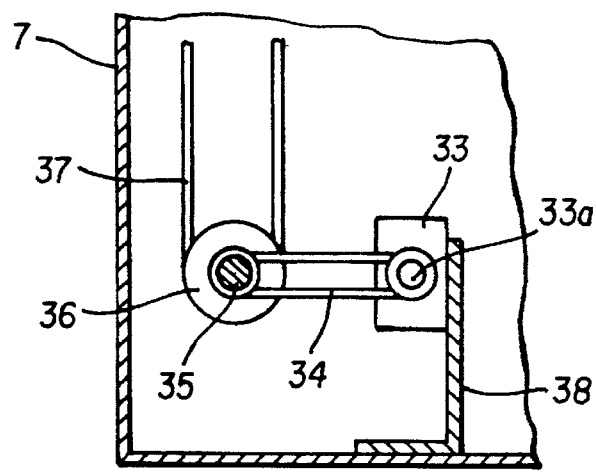
FIG. 4 is a sectional side view of part of the apparatus of FIG. 3 along line C—C.

Each end of lower shaft 9 of transport table 8 has a recess 19a acting as dog. One-way jaw clutches 10, 11 with dogs 10a, 11a which can be brought into engagement with recesses 19a of shaft 19 are located on both end positions of transport table 8. FIG. 3 shows, in particular, stationary rotating one-way jaw clutches 10, 11 driven together by shaft 35a over drawing means 37, 45 guided on wheels 43, 44 and 36, 46. Drawing means 34 facilitates the engagement of drive shaft 35a (see FIG. 4) with drive shaft 33a of motor 33. One-way jaw clutches 10, 11 can be moved in axial direction against a spring bias, thereby creating a compensation for different back-and-forth movements of transport table 8.

Figure 8:
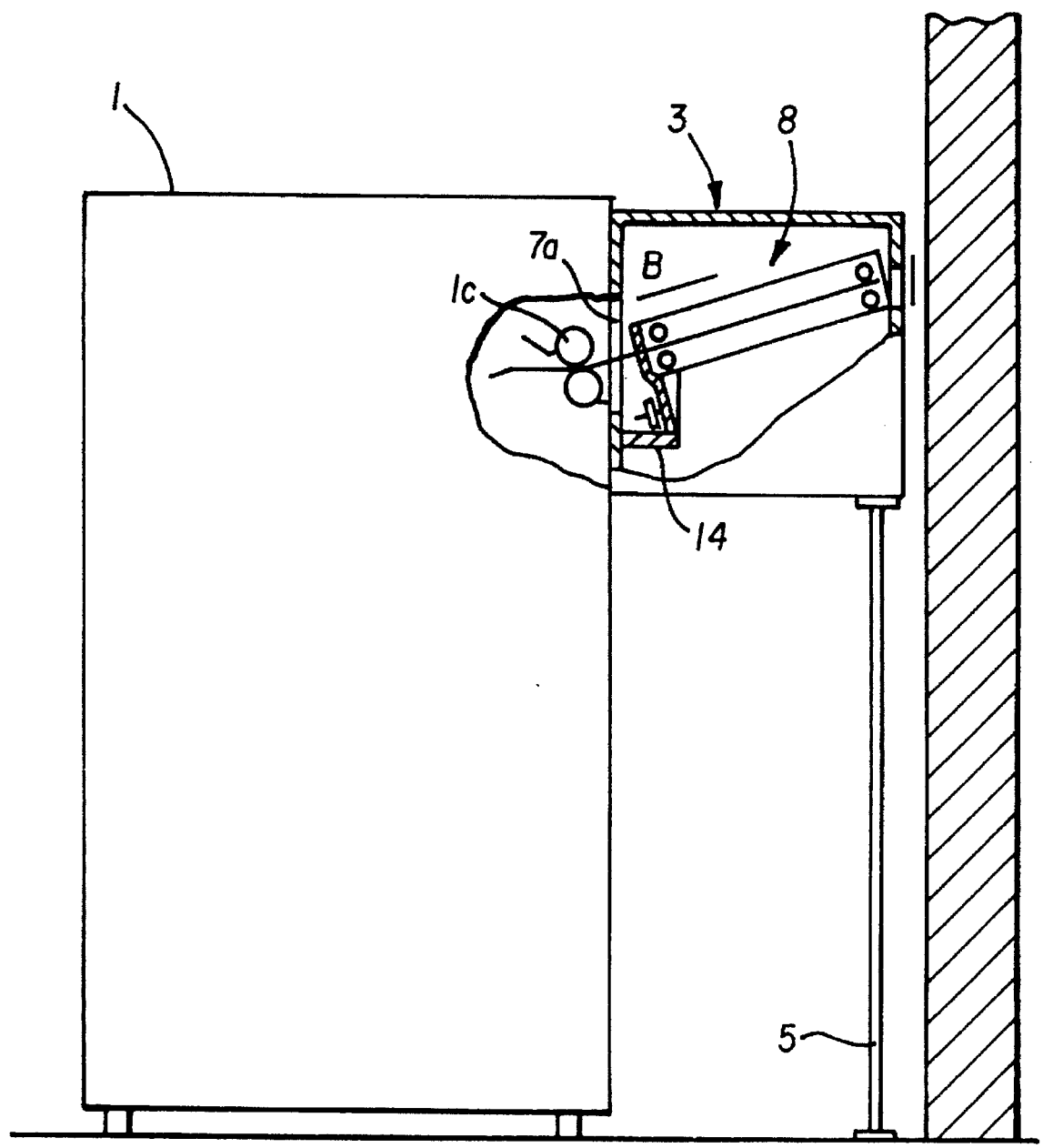
FIG. 8 is the apparatus of FIG. 2 in the position on the cassette loading/unloading unit, partially in section.
Figure 9:
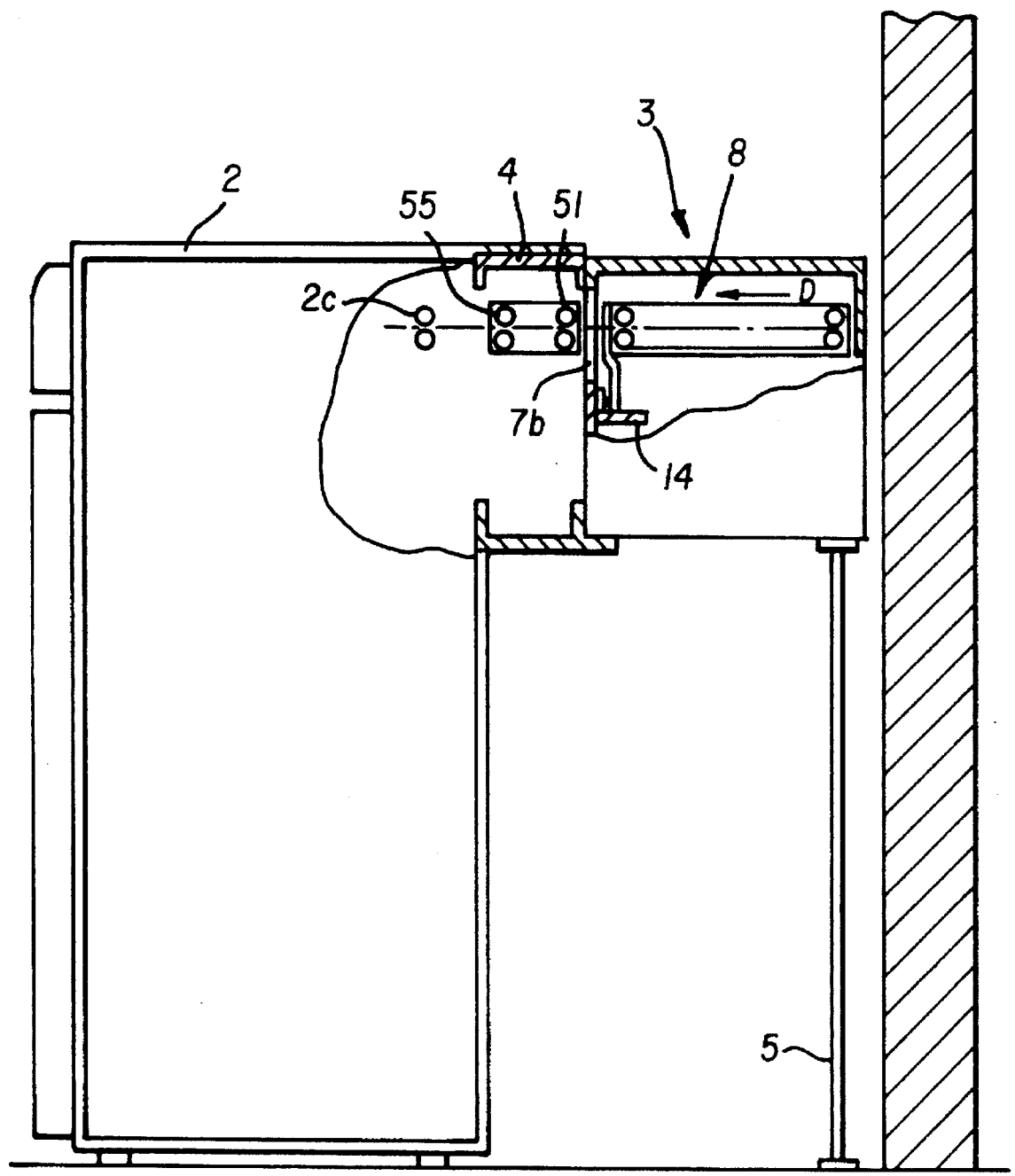
FIG. 9 is the apparatus of FIG. 2 in the position opposite the processing unit, including the interposed adapter, partially in section.

Mode of operation of the inventive apparatus:

FIG. 8 shows transport table 8 in its first end position in which it is positioned in the extension of output opening 1a of loading/unloading unit 1 in such a manner that its front end 17, 20 is in the transport plane of transport means 1c.

A cassette (not illustrated) containing exposed sheet film is inserted in loading opening 1a of loading/unloading unit 1 in the direction of arrow "A" (see FIG. 11). As described, the cassette is opened inside the unit, the exposed film removed and ejected by transport means 1c through the rear output opening 1b of loading/unloading unit 1. Sensors detect the leading edge of the sheet film in a manner known per se and activate motor 33 which drives shaft 19 over one-way jaw clutch 10 and hence the pairs of transport rollers 17, 20.

The ejected sheet film is then be gripped by transport rollers 17, 20 and transported on transport belts 22 which are driven in the same sense of direction. When viewed perpendicular to transport direction "B", a particularly wide sheet film 54 (only indicated in FIG. 6) arrives on transport table 8, it is assured that said wide sheet film 54 can later enter the relatively narrow input opening 2b of processing unit 2 in an appropriately centered manner.

Figure 6:
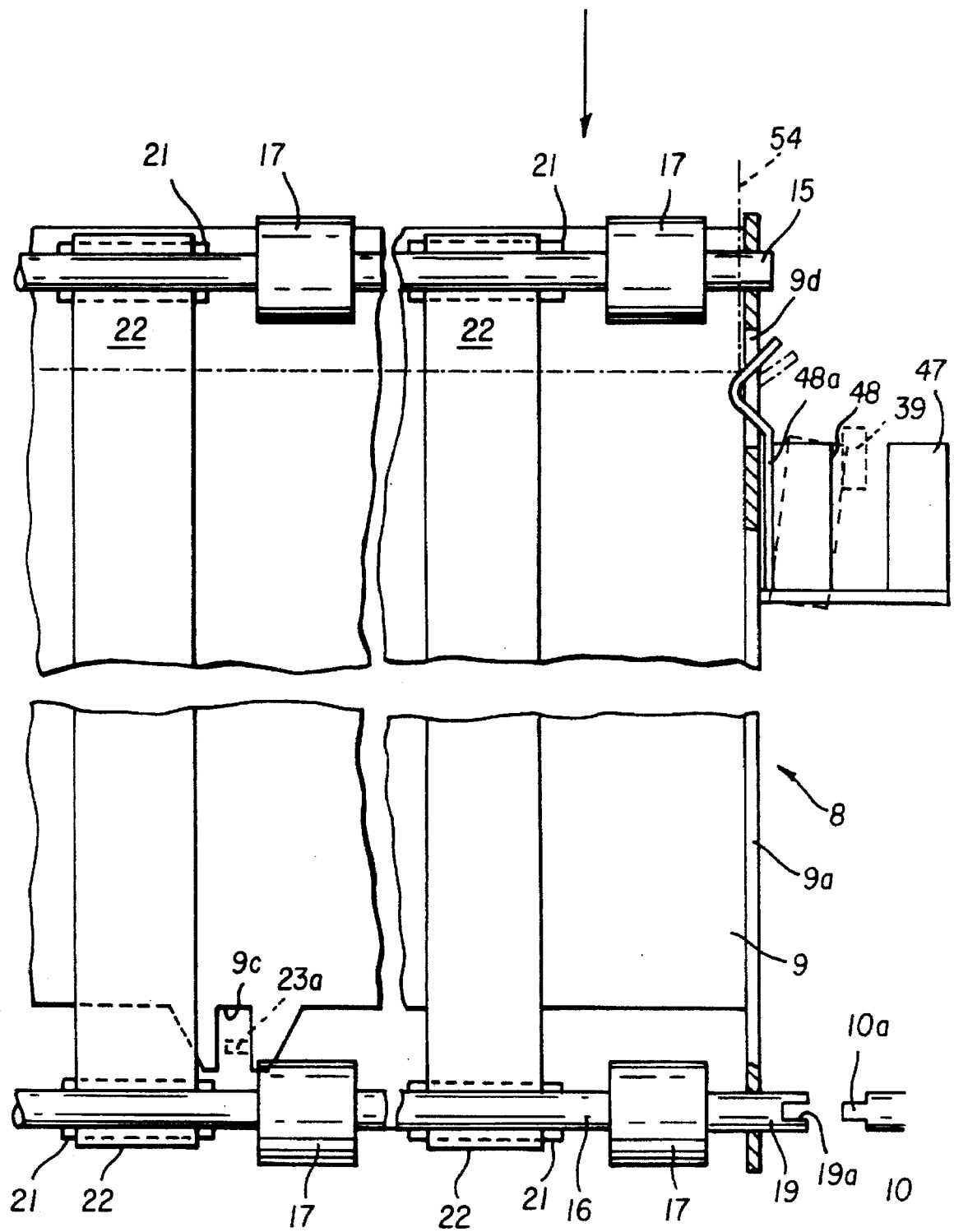
FIG. 6 is a plan view of part of the apparatus of FIG. 2.

Activating pin 48b of pivoting cover flag 48 achieves this in the situation shown by FIG. 6 by extending into the path of movement of the right edge of sheet film 54 thereby pivoting said sheet film into the position indicated by the chain line. As a result, cover flag 48 moves, as indicated, into a different home position relative to photoelectric barrier 39 (indicated in FIG. 6 for clarification) associated with a second, still to be described, end position of transport table 8.

As soon as the sensor detects the trailing edge of sheet film 54, motor 33 is de-energized so that shaft 35a, and therefore the entire transport on transport table 8 is stopped. At the same time, motor 29 is energized and moves carriage 23 in the direction of arrow "C" until transport table 8 hinged to the latter assumes its second end position (home position) shown in FIG. 9. As transport table 8 moves in the direction of arrow "C", its front end (transport rollers 17, 20) is pivoted over the inclined guideway 14 up to a level where transport table 8 is positioned in its second end position representing the extension to input opening 2b of processing unit 2 or the interposed adapter 4 (see FIG. 9).

Before reaching this second end position, said first cover flag 47 of transport table 8 passes photoelectric barrier 39, thereby initiating a reduction of the travel speed of carriage 23. In so doing, the recess 19a of shaft 19 comes into engagement with dog 11a of one-way jaw clutch 11, whereby the axial movement of the latter allows its reliable engagement in different end positions of transport table 8.

Adapter 4 on the input side of processing unit 2 mainly bridges the small unit depth of processing unit 2; as a result of this the front sides or both adjacent units 1 and 2 will be on substantially the same plane.

Relative to photoelectric barrier 39, carriage 23 is stopped in the second end position somewhat earlier because cover flag 48 pivoted to the right by sheet film 54 has already reached photoelectric barrier 39 as described and indicated in FIG. 6. Due to this, sheet film 54 is positioned opposite input opening 2b in an exact position such that said film may be transported without disruption into processing unit 2.

On its path into processing unit 2 said sheet film passes first through adapter 4. The leading edge of sheet film 54 enters the nip of the first pair of rollers 51 (see FIG. 9) of adapter 4 thereby lifting the upper roller of the latter and activating a switch which starts a driving motor (not illustrated). By means of a not illustrated one-way clutch said driving motor drives the lower roller of a second pair of rollers 55 which is connected by drawing means with the lower roller of said first pair of rollers 51. The transport speed in adapter 4 initially corresponds to that of transport table 8. Before the leading edge of sheet film 54 reaches film transport means 2c of processing unit 2, the input transport speed is reduced sufficiently in a known not illustrated manner to allow sheet film 54 to be drawn by film transport means 2c into processing unit 2. The one-way clutches of adapter 4 and transport table 8 assure that said sheet film can be drawn freely by the transport means of the latter into processing unit 2.

Inside processing unit 2 the input sheet film is treated in a conventional not illustrated manner and then ejected through film output opening 2a into receiving tray 2d.

As shown by FIGS. 1 and 11 in particular, the input of the exposed sheet film and the output of the processed finished sheet film take place in a particularly convenient manner on the same adjacent coplanar front of units 1 and 2.

After the sheet film's trailing edge has left film transport rollers 17, 20 of transport table 8 motor 29 is started by not illustrated means. By being reversed, said motor effects the reverse transport of carriage 23 and hence of transport table 8 (opposite the direction of arrow "C", see FIG. 11) into the first end position of said loading/unloading unit. In so doing, the front end (transport rollers 17, 20 of transport table 8) is lowered over the inclined surface of guideway 14 to a level (see FIG. 8) at which the transport plane of transport table 8 again becomes the extension of transport means 1c of loading/unloading unit 1. As transport table 8 moves on its path in the direction opposite arrow "C", cover flags 49, 56 shown in FIG. 5, which are configured like cover flags 47, 48 on the opposite side and perform the same function, enter the effective range of the second photoelectric barrier 14. Rigid cover flag 49 reduces the travel speed of carriage 23 as it passes photoelectric barrier 40, thereby assuring that transport table 8 is stopped in an exact position opposite output opening 1b of loading/unloading unit 1 when pivoting cover flag 56 passes the photoelectric barrier and, as a result, switches off motor 29.

Figure 10:
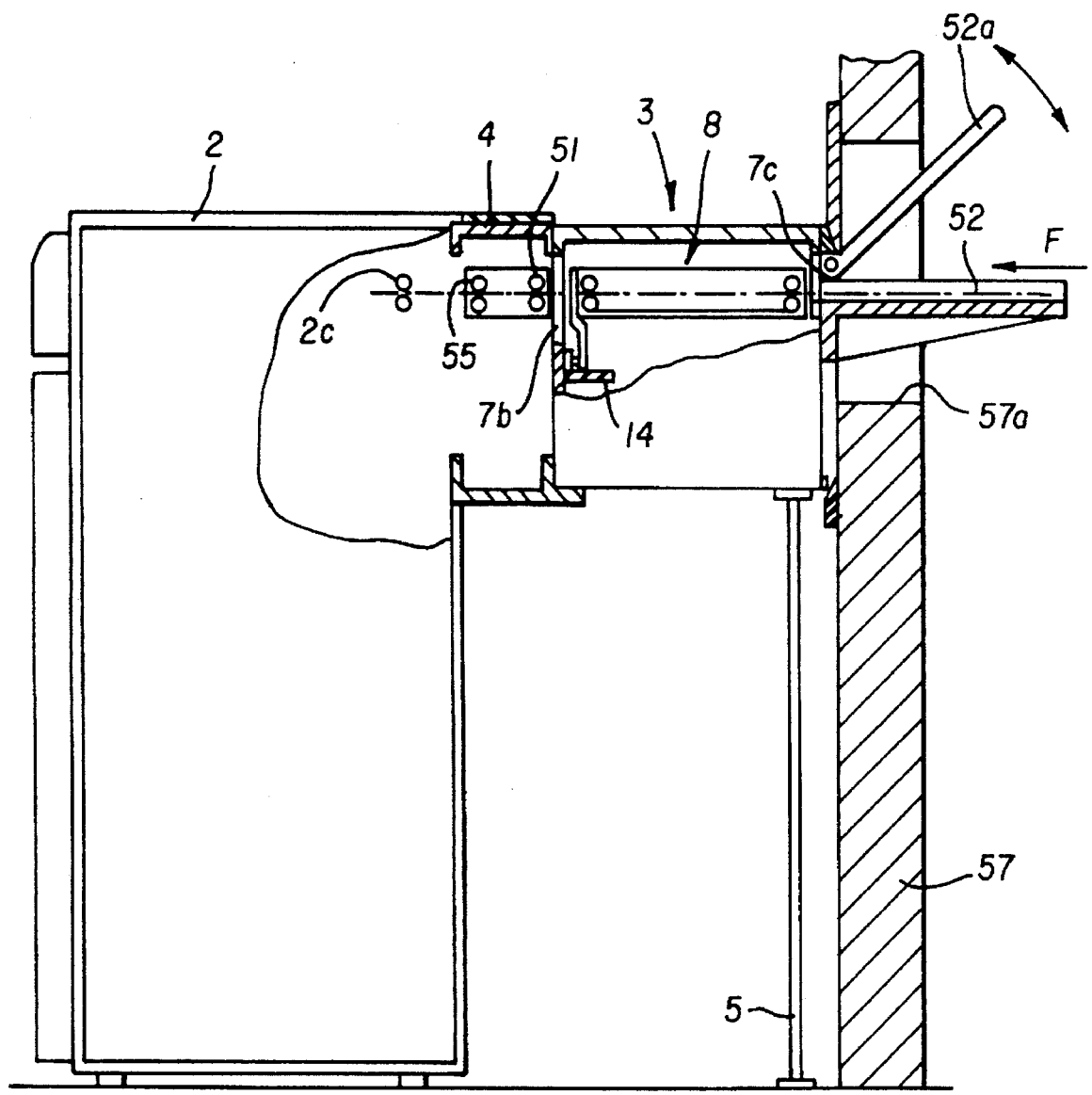
FIG. 10 is another example of the embodiment of the invention herein in accordance with FIG. 9 with an additional sheet film input device, partially in section.

In an expanded embodiment of the invention herein film transport apparatus 3 is coupled with an input device 58 for exposed sheet film as shown by FIGS. 10 and 11. Said input device permits the input of particularly long sheet films which cannot be fed into loading/unloading unit 1 directly and straight into processing unit 2.

Input device 52 mounted to the rear wall of film transport apparatus 3 communicates through opening 7c (see FIGS. 3 and 11) with transport table 8 positioned in its home position opposite input opening 2a of processing unit 2. Input device 52 extends through a light-tight opening 57a of a wall 57 into a not illustrated darkroom and is operator-controlled from there. Input device 52 comprises a pivotable, hinged cover 52a which is closed after a sheet film removed from a cassette in the darkroom has been inserted. The inserted sheet film is advanced in the direction of arrow "F" as shown by FIG. 11. In so doing, the leading edge of the sheet film activates a not illustrated switch energizing motor 33 to drive shaft 19, whereupon the film transport proceeds as described in the direction of arrow "D" into processing unit 2.

Beyond the described purpose of use, input device 52 offers an additional substantial advantage, that is, even when said loading/unloading unit may not be used due to maintenance, exposed sheet films may still be transported from the darkroom into processing unit 2 as described.

Departing from the apparatus setup shown by FIGS. 1, 7 and 11, the left/right arrangement may be reversed easily, should this be desirable. This (not illustrated) simply requires that adapter 4 be installed opposite processing unit 2 located on the other side and that guideway 14 be inclined appropriately in opposite direction. The necessary installation and adjustment means (not illustrated) are provided on film transport apparatus 3 and adapter 4. Considering this reversed right/left association of units 1 and 2, pivoting cover flag 56 assures accurate positioning of the sheet film relative to processing unit 2 in that activating pin 56a can be pivoted by the sheet film which is transported out of loading/unloading unit 1.

Said installation and adjustment features on film transport apparatus 3 also permit the adaptation of guideway 14 to other vertical arrangements of input opening 2b of processing unit 2. For example, in another commercially available (not illustrated) processing unit said input opening 2b is located in vertical direction below input opening 1b of loading/unloading unit 1. Departing from the example of embodiment shown in FIG. 7, this requires that guideway 14 be inclined toward the right, which can be achieved easily by appropriate installation and adjustment.

In another commercially available (not illustrated) processing unit said input opening 2b is located in vertical direction below output opening 1b of loading/unloading unit 1 such that guideway 14 would have to be inclined steeply. In order to prevent this, the entire housing 7 of film transport apparatus 3 can be adjusted by not illustrated means, thus making an adaptation to special conditions possible as well.

As is shown by FIG. 1, the particularly favorable arrangement of transport apparatus 3 leaves an open space below the latter which may accommodate, for example, a silver recovery unit 6 connected with processing unit 2 without requiring additional floor space.

Parts List:

A . . . arrow
B . . . arrow
C . . . arrow
D . . . arrow
F . . . arrow

1 . . . loading/unloading unit
1a . . . loading opening
1b . . . output opening
1c . . . transport means
2 . . . processing unit
2a . . . film output opening
2b . . . input opening
2d . . . receiving tray
3 . . . apparatus
4 . . . adapter
5 . . . adjustable supports
6 . . . silver recovery unit
7 . . . housing
7c . . . opening
8 . . . transport table
9 . . . support
9a,9b . . . limiting walls
9c . . . recess
9d . . . opening
10,11 . . . one-way jaw clutches
10a,11a . . . dogs
12 . . . arm
13 . . . rotating wheel
14 . . . guideway
15,16 . . . parallel shafts
17,20 . . . pair of transport rollers
18,19 . . . lower shafts
19a . . . recess
21 . . . guide rollers
22 . . . transport belts
23 . . . carriage
23a . . . carriage projection
23b . . . support sites
23c . . . projection
24,25,26,27 . . . pair of rollers
28 . . . stationary rail
28a,28b . . . running surfaces
29 . . . stationary motor
29a . . . drive shaft
30 . . . drive wheel
31 . . . drawing means
32 . . . stationary wheel
33 . . . motor
33a . . . drive shaft
34,37,45 . . . drawing means
35a . . . shaft
36,46,43,44 . . . wheels
39,40 . . . photoelectric barriers
41,42 . . . holders
47,48,49,56 . . . cover flags
48a . . . flexible elastic arm
48b,56a . . . activating pin
52 . . . input device
52a . . . hinged cover
54 . . . sheet film
57 . . . wall
57a . . . light-tight opening
58 . . . input device

What is claimed is:

1. Apparatus for transporting sheet recording material, in particular sheet film, from a cassette loading/unloading unit to a processing unit comprising, interposed between the output opening of said loading/unloading unit and the input opening of said processing unit, a transport table which comprises driven transport means and bridges differences between the vertical positions of said output and input openings of said loading/unloading unit and said processing unit, respectively, and is selectively adapted so said openings, characterized in that a) the transport table comprises means for permitting the table to be moved back and forth along horizontally adjacent output and input openings of loading/unloading unit and processing unit;

b) the transport means of transport table comprises means for positioning the transport means in output and input transport directions can be driven in output transport direction in a first end position of said transport table associated with output opening and in input transport direction in a second end position associated with input opening; and c) the transport table comprises means for permitting the table to be moved in vertical direction such that its front end facing said input and output openings can be raised and lowered into the transport plane of said output and input openings.

2. Apparatus in accordance with claim 1, characterized in that a) the transport table comprises means for transporting the recording material in a substantially flat manner can be pivoted in vertical direction so that its front end facing output and input openings can be raised and lowered into the transport plane of said output and input openings; and b) that its rear end facing away from output and input openings can be pivoted in vertical direction about a stationary support.

3. Apparatus in accordance with claim 2, characterized in that a) a rotatable wheel supported by a stationary guideway is mounted to the front end of transport table;

b) guideway extends from output opening of loading/unloading unit to input opening of processing unit (2);

c) guideway extends along path of movement of transport table at an inclination controlling the vertical pivot path of the front end of transport table; and d) transport table is movably guided by its rear end in horizontal direction.

4. Apparatus in accordance with claim 3, characterized by means for selectively adjusting the inclination and/or elevation of guideway in housing.

5. Apparatus in accordance with claim 2, characterized in that stationary supports for the rear end of transport table are mounted on a horizontally guided carriage which is moved by a reversible motor into respective end positions.

6. Apparatus in accordance with claim 5, characterized in that a) parallel, as well as vertically superposed, pairs of moving rollers having concave running surfaces are rotatably supported on carriage in the rear end portion of transport table; and b) moving rollers move in a form-closed manner over a guide rail having parallel, convex running surfaces extending in horizontal direction between pairs of moving rollers.

7. Apparatus in accordance with claim 6, characterized in that a drawing means guided on rotating wheels is fastened to carriage parallel to guide rail, and that one of said wheels can be driven by a reversible motor in order to move said drawing means and said carriage.

8. Apparatus in accordance with claim 1, characterized in that a) the transport means of transport table comprise endless transport belts which are guided on first rotatably supported shafts and guide rollers;

b) second rotatable shafts, which are spring-biased against said first shafts, are provided above said first shafts and parallel to said first shafts;

c) pairs of transport rollers opposite each other and in contact with each other are mounted to shafts;

d) transport belts are provided between pairs of transport rollers; and e) first shaft associated with the rear end of transport table has on each of its end sides a dog which can be brought into engagement with a driving device in first and second end positions of transport table.

9. Apparatus in accordance with claim 8, characterized in that a) the driving device for transport table comprises driven one way jaw clutches which are mounted rotatably at each end position of transport table and brought into engagement with dog associated with first shaft; and b) said one-way jaw clutches are in engagement with drawing means which are driven over a joint drive shaft by a reversible motor.

10. Apparatus in accordance with claim 8, characterized in that a) shafts of transport table are rotatably supported by a support;

b) support comprises lateral limiting walls parallel to transport direction guiding the recording material;

c) two cover flags are mounted in sequence at a distance from each other in the direction of movement of carriage, whereby said flags are associated with stationary photoelectric barriers provided at the end positions of transport table;

d) one of said cover flags is mounted to a flexible elastic arm; and e) said flexible elastic arm comprises an activating pin extending through opening of the respective limiting wall into the transport zone of the recording material.

11. Apparatus in accordance with claim 1, characterized in that transport table and its guiding and driving means are accommodated in a light-tight housing which can be mounted to cassette loading/unloading unit and processing unit and can be adjusted selectively in vertical direction relative to the units' output and input openings.

12. Apparatus in accordance with claim 11, characterized in that, on the side of housing facing processing unit and loading/unloading unit, an opening is provided in the transport plane of the respective input and output openings of units constituting an extension of the respective end positions of transport table, and that an adapter can be attached to opening in order to bridge different unit depths for transport of the recording material between transport table and the respective unit.

13. Apparatus in accordance with claim 12, characterized in that driven pairs of transport rollers are provided in the transport plane ahead of unit transport means.

14. Apparatus in accordance with claim 11, characterized in that, on the side of processing unit facing the rear side of housing, an opening associated with input opening of processing unit and constituting an extension of the transport plane of the associated end position of transport table is provided for the light-tight attachment of a darkroom side input device for large-format recording material.

* * * * *

UNITED STATES PATENT AND TRADEMARK OFFICE
CERTIFICATE OF CORRECTION

PATENT NO. : 5,660,383
DATED : August 26, 1997
INVENTOR(S) : Friedrich Ueffinger, et al It is certified that error appears in the above-indentified patent and that said Letters Patent is hereby corrected as shown below:

On the title page: Item [30]

Please insert --Foreign Application Priority Data
May 14, 1994 German P4417050.5--

Signed and Sealed this

Eleventh Day of November, 1997

Attest:

BRUCE LEHMAN

Attesting Officer
Commissioner of Patents and Trademarks